United States Patent
Jacquot et al.

(10) Patent No.: US 7,272,548 B2
(45) Date of Patent: Sep. 18, 2007

(54) METHOD OF SIMULATING AN ENTERPRISE COMPUTING MANAGEMENT SYSTEM

(75) Inventors: Bryan J. Jacquot, Windsor, CO (US); Michael A. Kingdom, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 724 days.

(21) Appl. No.: 10/456,199

(22) Filed: Jun. 5, 2003

(65) Prior Publication Data

US 2004/0249622 A1    Dec. 9, 2004

(51) Int. Cl.
G06F 9/44     (2006.01)
G06F 15/173   (2006.01)
(52) U.S. Cl. .................. 703/21; 709/223; 709/225
(58) Field of Classification Search ............ 703/21
See application file for complete search history.

(56) References Cited

U.S. PATENT DOCUMENTS

2001/0027470 A1*  10/2001  Ulmer et al. ............... 709/203
2004/0024854 A1*   2/2004  Mandal ....................... 709/223

OTHER PUBLICATIONS

Hosoon et al., titled, "Web-based Configuration Management Architecture for Router Networks" 2000 IEEE p. 173-186.*
Tagg-R., "Workflow in Different Styles of Virtual Enterprise" 2001 IEEE p. 21-28.*

* cited by examiner

*Primary Examiner*—Anthony Knight
*Assistant Examiner*—Thomas Stevens

(57) ABSTRACT

A method of simulating an enterprise computing management system is disclosed. The method includes receiving a simulated management infrastructure stack; and using the simulated management infrastructure stack and a user application to simulate the enterprise computing management system.

28 Claims, 2 Drawing Sheets

METHOD OF SIMULATING AN ENTERPRISE COMPUTING MANAGEMENT SYSTEM

TECHNICAL FIELD

The invention relates to enterprise computing management systems; in particular, a method of simulating an enterprise computing management system using a simulated management infrastructure stack.

BACKGROUND ART

Computer systems running on distributed platforms can be managed remotely from a central location using a management infrastructure stack and a user application. Management of the systems includes gathering data on the hardware and software components, and testing various components and operating scenarios on the system. A computer system comprising a real distributed platform infrastructure is referred to herein as a real enterprise computing system.

A management infrastructure stack (202, 203, 204, 205), shown schematically in FIG. 2, comprises software and hardware components. The software component includes client application interface 202, server daemon 203, and server daemon plug-in 204. The hardware component includes service processor 205. In the stack, the components are in communication with each other and cooperate in managing the system either directly or through a computer network. An exemplary stack as shown in FIG. 2 is referred to herein as a real management infrastructure stack.

A user application 202, as shown schematically in FIG. 2, is software that functions with the management infrastructure stack (202, 203, 204, 205) to manage the enterprise computing management system. The user application 201 provides user functions, for example, a graphical user interface; functions for creating, modifying and deleting hardware partitions; functions for automatic detection of configuration and hardware problems; functions to view and print hardware inventory status; and a comprehensive on-line help.

In practice, the configuration of a user application 201 and a real management infrastructure stack in a real enterprise management computing system is flexible. For example, the user application 201 and the client application program interface 202 can reside on a Web server, while the server daemon 203 and the server daemon plug-in 204 can reside on the service processor 205; alternatively, the WEB server can be on one server, the server daemon 203 and daemon plug-in 204 can be on another server, and deamon-plugin 204 communicates with the service processor 205 in a third server.". In this exemplary configuration, communication between the user application 210 and the client application program interface 202 (residing on the web server), and the other portion of the real management information stack (residing on the service processor) can be direct or indirect via a network connection such as the Internet. Other configurations are possible and are well known in the art.

In the conventional art, to obtain data from on the enterprise management computing system and/or perform a test on the system, a user will log-on to the user application 210 and enter a request. The request is passed to the client application program interface 202 where it is converted to a format for transmission to the server daemon 203. The server daemon 203, on receiving the request, will invoke the server daemon plug-in 204 to handle the request. In handling the request, the server daemon plug-in 204 will make systems calls or the like to gather information to fulfill the request and provide a reply. The information is usually available from the service processor 205 which, typically, is the single point of contact for information on the system. The reply is returned to server daemon 203 for interpretation and integration, and thereafter passed to the client application interface 202 where it is converted to a format for presentation to the user at the user application 201. In this regard it should be noted that service processor 205, as the single point of contact in the hardware, allows for crossing of one or more operating systems boundaries to get information on the system.

In the conventional art, a pre-requisite for using or testing a real management infrastructure stack 202, 203,204,205 is that the stack must be complete and fully functional as a unit. That is, all the components of the stack, i.e., the client application program interface 202, the server daemon 203, the server daemon plug-in 204 and the service processor 205, must be integrated in the stack and functioning as a unit.

A problem with the fully functional requirement is that if it is desired to test a user application 201 or demonstrate a prototype of an enterprise computing system, while the stack is still being developed, the test or demonstration cannot be done until the real stack is available.

Another problem with the fully functional requirement is that, after the sack 202, 203,204, 205 is developed, since the software components are large and the hardware component is expensive, if it is desired to merely demonstrate features of the real stack on a small computer without investing in a service processor 205, the demonstration will not be possible without a connection to a real stack.

Accordingly, in view of these and other problems of the conventional art, it is an objective of the invention to provide for a simulated management infrastructure stack that will allow for testing the user application, or demonstrating an enterprise management system on a portable system, without requiring a connection to a real management infrastructure stack.

These and other objectives of the invention will no doubt become obvious to those of ordinary skill in the art on reading the following detailed description of preferred embodiments in conjunction with the various Figures.

SUMMARY OF THE INVENTION

Embodiments of the invention provide a method of simulating an enterprise computing management system comprising receiving a simulated management infrastructure stack; and using said simulated management infrastructure stack and a user application to simulate said enterprise computing management system.

BRIEF DESCRIPTION OF THE DRAWINGS

The following Figures which are incorporated herein and form a part of this specification illustrate embodiments of the invention. Together with the description, they serve to explain the principles of the invention.

BEST MODE FOR CARRYING OUT THE INVENTION

Figure 1:
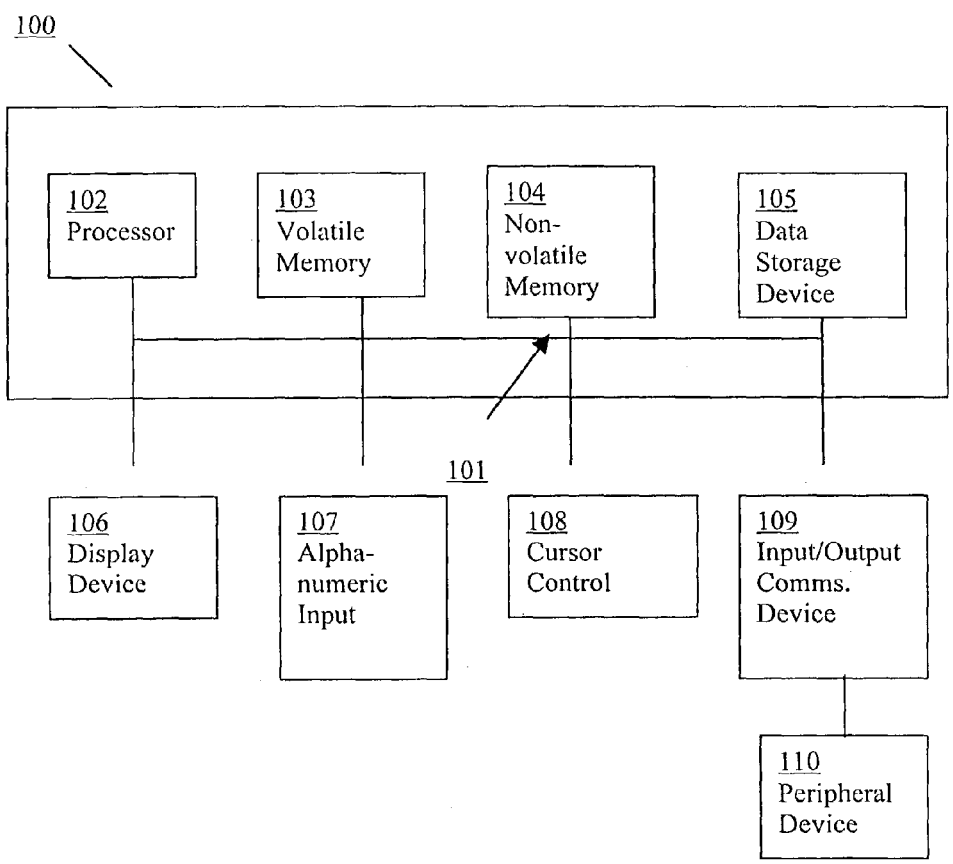
FIG. 1 is a block diagram of an exemplary computer system on which embodiments of the invention may be practiced.

In overview, embodiments of the invention provide a method and system of simulating an enterprise computing management system using a simulated management infrastructure stack with a user application.

In one embodiment, the client application program interface in a real management infrastructure stack 202,203,204, 205 is replaced by a simulated client application program interface 401 that, has no dependency on the other components in the real management infrastructure stack 202, 203,204,205, i.e., the simulated client application program interface 401 has no dependency on the server daemon 203, the server daemon plug-in 204 and the service processor 205 in the real management infrastructure stack.

In the invention, since the user application 201,301 is not changed, a user can use the user application 201,301 with the simulated management infrastructure stack 302 to simulate an enterprise computing management system, or test the user application 201, without the need for any of the components of a real management infrastructure stack 202, 203,204,205.

Later on, when the real management infrastructure stack available, the simulated management infrastructure stack 302 can be replaced in a manner that is transparent to the user application 201,301 since the user application is not aware of which version of management infrastructure stack is running, the real or the simulated version.

The simulated management infrastructure stack 302 is software that provides the same functionality as a real stack but without the need for the hardware or software component of the real stack. With the simulated management infrastructure stack 302, an enterprise computing management system can be simulated or demonstrated on a portable computer, while the stack 202,203,204,205 is still being developed. Similarly, with the simulated management infrastructure stack 302 the user application can be tested or demonstrated without the need for a fully functional and available real stack.

Reference will now be made in detail to embodiments of the invention, examples of which are illustrated in the accompanying drawings. While the invention will be described in conjunction with preferred embodiments, it will be understood that the description is not intended to limit the invention to these embodiments. On the contrary, the invention is intended to cover alternatives, modifications and equivalents which may be included within the spirit and scope of the invention as defined by the appended claims.

In the description of the invention, specific details are set forth in order to provide a thorough understanding of the invention. However, it will be appreciated by one ordinarily skilled in the art that the invention may be practiced without these specific details. In other instances, well known methods and procedures are not described in detail so as to avoid unnecessarily obscuring aspects of the invention.

Some portions of the description which follow are presented in terms of executing a procedure on data bits that can be performed on computer memory. A procedure is here and is generally conceived to be a self-consistent sequence of steps or instructions leading to a desired result. The steps are those requiring physical manipulations of physical quantities in a computer system. It should be noted that all this and similar terms are to be associated with the appropriate physical quantities and are merely convenient labels applied to these quantities. Also, unless specifically stated otherwise as apparent from the following discussions, discussions utilizing terms such as "simulating," or "receiving," or "contacting," or "requesting," or "comparing," or "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display equipment.

Embodiments of the invention are comprised of computer-readable and computer-executable instructions that reside, for example, in computer system 100 of FIG. 1, which may be a part of a general purpose computer network (not shown), or may be a stand-alone computer system. It will be appreciated that computer system 100 of FIG. 1 is exemplary only and that the invention can operate within a number of different computer systems including general-purpose computer systems, embedded computer systems, laptop computer systems, hand-held computer systems, stand-alone computer systems and networked computer systems including the Internet.

In an embodiment of the invention, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 105 (e.g., a magnetic, optical, floppy, or tape drive or the like) for storing data. It should be noted that the software program comprising a simulated management infrastructure stack for simulating a real enterprise computing management system or testing a user application in accordance with an embodiment of the invention can be stored either in volatile memory 103, data storage device 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown). Optional display device 106 of FIG. 1 may be a liquid crystal device, cathode ray tube, or other display device suitable for creating graphic images and alpha-numeric characters recognizable to a user.

Computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server system, whereby a number of clients (e.g., personal computers, workstations, portable computers, minicomputers, terminals, etc.) are used to run processes for performing desired tasks (e.g., "simulating", or "requesting," or "receiving," or "sending", or "contacting," or "determining," or "comparing," or "generating,", etc.). In particular, computer system 100 can be coupled in a system for executing a software application program that embodies aspects the invention.

Figure 2:
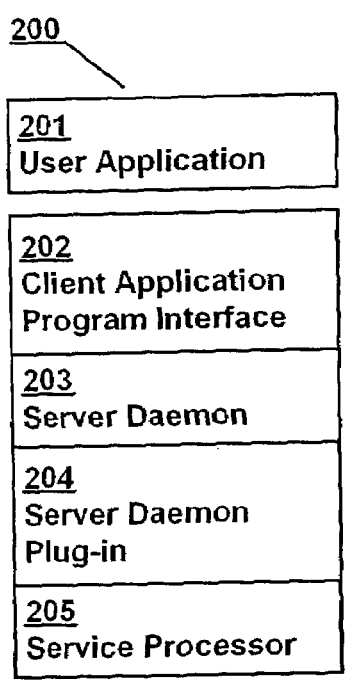
FIG. 2 is a block diagram illustrating a prior art management infrastructure stack and a user application.
Figure 3:
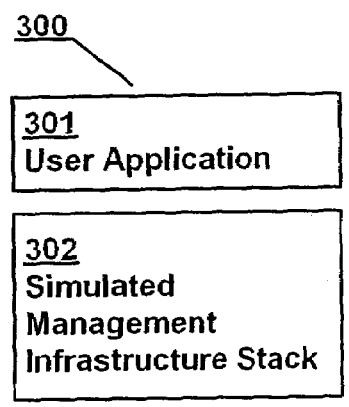
FIG. 3 is a block diagram illustrating a simulated management infrastructure stack and a user application in accordance with the invention.

FIG. 3 is a block diagram 300 of a simulated management infrastructure stack 302 and a user application 201,301, in accordance with an embodiment of the invention. In FIG. 3, the user application 301 is the same user application 201 used in the prior art shown in FIG. 2. As noted elsewhere herein, user application 301, 201 includes, but is not limited to, functions for a graphical user interface; functions for creating, modifying and deleting hardware partitions; functions for automatic detection of configuration and hardware problems; functions to view and print hardware inventory status; and a comprehensive on-line help.

For convenience in describing the invention in the following sections, an embodiment of the invention, implemented in compliance with the Web-Based Enterprise Management (WBEM) standard for accessing management information on cross-platform technologies, is discussed. However, it should be noted that notwithstanding this example, the invention is not limited to a simulated management information stack 302 that complies with the WBEM standard, but that the invention is applicable to all stacks, and their equivalents, that embodied the invention as set forth in the claims, regardless of the standard or protocol used in developing the stack. As is known to those ordinarily skilled in the art, WBEM is an initiative based on a set of management and Internet standard technologies developed to unify the management of enterprise computing environments. WBEM provides the ability for the industry to deliver a well-integrated set of standard-based management tools leveraging the emerging technologies such as CIM and XML. With WBEM, system administrators can monitor and control computing resources from diverse sources, thus enabling increased control of their enterprise system at lower costs.

Similarly, for convenience in describing the invention, an embodiment of the simulated management information infrastructure stack 302 described herein is implemented using the Java programming language and, in describing the invention, a server referred to as the Superdome is used Superdome is an entire server containing 4-64 processors. In this regard, it should be noted that, notwithstanding the use of the Java language in this example and the reference to the Superdome server, the invention is not limited to an implementation based on the Java language or on the referenced Superdome server, but it is applicable any implementation and their equivalents that embodied the invention as set forth in the claims, regardless of the programming language in which it is implemented, or the hardware used.

Figure 4:
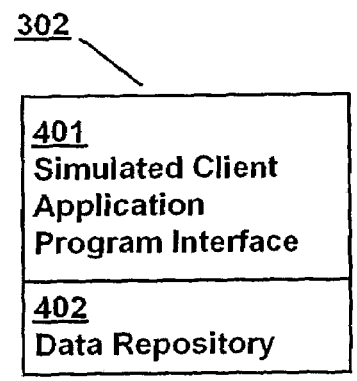
FIG. 4 is a block diagram illustrating a simulated client application program interface and a user application in accordance with the invention.

Referring to FIGS. 3 and 4, in one embodiment, the simulated management infrastructure stack 302 comprises a simulated client application interface 401 and a data repository 402. The data repository 402 is a conventional database comprising data pertaining to the management of a real enterprise computing system. Such data can be provided by the user application 201,301 and a real server daemon plug-in 204 querying in a real management infrastructure stack 202,203,204,205. As noted previously, the simulated client application program interface 401 is a simulation of the real management infrastructure stack, but with no dependency on any component of the real stack, i.e., the simulated client application program interface 401 has no dependency on the server daemon 203, the server daemon plug-in 204 and the service processor 205 of a real stack.

In one embodiment, the simulated application program interface 401 can be created using Java ResourceBundles in a conventional way well known to one ordinarily skilled in the art. In this regard, it should be noted that several alternative Java facilities can be used for this purpose, including the Java PropertyFiles and Java Preferences as each of these facilities works by in a similar manner i.e., reading a file and parsing it into key/value pairs.

For example, and in accordance with the invention, the Java ResourceBundles is used to create and store the simulated configurations in a set of files that could easily be edited and changed. Since the files created represent data available from the daemon plug-in, the simulated client application program interface 401 can go to these files and get the data requested and provided the data in response to a query from the user application 201,301. The data requested can include any information on the system, e.g., cells, CPU's, memory, I/O, Network cards and others. The requested data is returned in a format comprising either an array of all the items requested or an individual value, depending on the type of value which would be returned by the service processor 205.

To develop the simulated client application program interface 401 in this example, each class supported by the real server daemon plug-in 204 has an associated file. The file consists of a single keyword (which can be anything, but must be the same for all classes) followed by an equals sign (=) and then a list of the instance objects of the given class. An example of a single line from the HP_NParPartition-.properties file is:

instances=partition0|partition1

When the simulated management information stack 302 reads the above file in this example, it serves as a directive to open two additional files, partition0.properties and partition1.properties. Each of these files contains the properties for each respective object. An example of a portion of the partition0.properties file is:

PartitionLabel=par0
PartitionName=PayRoll
PartitionNameLabel=PayRoll (par0)
CellUseOnNextBoot=true|
PrimaryBootPath=0/0/1/0/0/0.4.0

The simulated client application program interface 401 in this example can be developed by simulating the WBEM java client's CIMInstance java class so it contained a ResourceBundle object. The WBEM Java client's enumerateInstances( ) method call causes the simulated client application program interface 401 to open the corresponding properties file, HP_NParPartition.properties in the above example. Upon parsing the properties file, it creates simulated CIMInstance objects which are constructed by passing the ResourceBundle's associated with the object files (i.e. partition0.properties and partition1.properties).

In this example, the simulated CIMInstance object stores the ResourceBundle object and when subsequent WBEM Java client getproperty( ) method calls are made on the simulated CIMInstance object, the simulated CIMInstance object parses the file looking for the given key, and returns the associated value. It should be noted that all parsing of the property files in this example is performed by the Java ResourceBundle interface, not by the simulated client application program interface. Given this model, the actual code for the simulated methods is extremely small and efficient.

In summary, a major benefit of using this mechanism in this example to simulate the client application program interface 202 is that it minimizes the logic and hard-coded values in the simulated client application program interface

401. All knowledge was pushed down to the data repository 402 (see above examples) so any server daemon plug-in 204 can be simulated by creating a set of data files. Furthermore, the data files can be generated from a running server daemon plug-in 204. This can be done by using the real client application interface 202 and writing a small tool to write the data returned by the server daemon plug-in to the text files, as described above. Taking this a step further, several configurations could be captured in a set of data files, and then used by automated testing facilities to test the application with different data sets.

This approach is also advantageous because it allows the user application 201, 301 using the simulated client application program interface 401 to remain unchanged, and a simple file replacement will result in the use or non-use of the simulated client application program interface 401.

In accordance with the invention, since the logic of the simulated client application program interface 401 is separate from the data being simulated, any server daemon plug-in 204 can be simulated with a simple change of a set of data files, which can be programmatically changed. Thus, a suite of automated tests could place a set of data files, execute a set of tests, and then change to a different set of data files without touching the simulated client application program interface 401 code or the user application 201,301.

Also in accordance with the invention it is possible to develop and test a user application 201, 301 that depends on, for example, a server daemon plug-in 204 without requiring the server daemon plug-in 204 to be available. For example, the user application 201, 301 and the simulated client application program interface 401 were used to perform usability testing with customers. Instead of needing a fully configured enterprise server 205 with a WBEM server 203 and WBEM server daemon 204, the user application 201, 301 was loaded on a laptop with the simulated client application program interface 401 and the desired set of data files in data repository 402; no other dependencies were needed. The system did not even require a network connection.

As will be appreciated, the invention allows for the user application to remain unchanged regardless of whether the simulated management infrastructure stack 302 is used or the real stack 202,203,204,205 is used. Simply moving the real Java jar file aside and putting the simulated Java jar file into place will cause the simulator to be used. Thus, testing of the user application 201,301 can be performed with high assurance that the entire application 201,301 is being exercised.

Embodiments of the invention are thus described. While the invention has been described in particular embodiments, it should be appreciated that the invention should not be construed as limited by such embodiments, but rather construed according to the following claims.

What is claimed is:

1. A method of simulating a real enterprise computing management system, comprising:
    forming a simulated management infrastructure stack based on at least a portion of a real management infrastructure stack;
    replacing at least one client application program interface of said real management infrastructure stack with at least one simulated client application program interface that has no dependency on any other component in the real management infrastructure stack; and
    using said simulated management infrastructure stack and a user application to generate a simulated enterprise computing management system.

2. The method of claim 1, wherein said simulated management infrastructure stack further comprises a data repository.

3. The method of claim 2, wherein said simulated client application program interface comprises software for processing a request for data for said real enterprise computing management system, and for providing a reply to said request.

4. The method of claim 2, wherein said simulated client application program interface comprise software for testing a real enterprise computing management system, and for providing results of the test.

5. The method of claim 2, wherein said simulated client application program interface comprises software for testing said user application, and for providing results of the test.

6. The method of claim 2, wherein said data repository comprises data representative of a real enterprise computing management system.

7. The method of claim 6, wherein data is independent of said simulated client application program interface.

8. The method of claim 1, wherein said real enterprise computing management system is simulated on a networked computer.

9. The method of claim 1, wherein said simulated management infrastructure stack and said user application are compliant with a WEBM protocol.

10. A method of testing a user application for managing an enterprise computing management systems, comprising:
    forming a simulated management infrastructure stack based on at least a portion of a real management infrastructure stack;
    replacing at least one client application program interface of said real management infrastructure stack with at least one simulated client application program interface that has no dependency on any other component in the real management infrastructure stack; and
    using said simulated management infrastructure stack to test said user application.

11. The method of claim 10, wherein said simulated management infrastructure stack further comprises a data repository.

12. The method of claim 11, wherein said simulated client application program interface comprises software for processing a request for data for a real enterprise computing management system, and for providing a reply to said request.

13. The method of claim 11, wherein said simulated client application program interface comprise software for testing a real enterprise computing management system, and for providing results of the test.

14. The method of claim 11, wherein said simulated client application program interface comprises software for testing said user application, and for providing results of the test.

15. The method of claim 11, wherein said data repository comprises data representative of a real enterprise computing management system.

16. The method of claim 15, wherein data is independent of said simulated client application program interface.

17. The method of claim 10, wherein said simulated management infrastructure stack and said user application are compliant with a WEBM protocol.

18. A computer-readable medium having computer-readable program code embodied therein for causing a computer to perform a method of simulating an enterprise computing management system, said method comprising:

forming a simulated management infrastructure stack based on at least a portion of a real management infrastructure stack;

replacing at least one client application program interface of said real management infrastructure stack with at least one simulated client application program interface that has no dependency on any other component in the real management infrastructure stack; and using said simulated management infrastructure stack and a user application to simulate said enterprise computing management system.

19. The computer-readable medium claim 18, wherein said simulated management infrastructure stack further comprises a data repository.

20. The computer-readable medium claim 19, wherein said simulated client application program interface comprises software for processing a request for data for a real enterprise computing management system, and for providing a reply to said request.

21. The computer-readable medium claim 19, wherein said simulated client application program interface comprise software for testing a real enterprise computing management system, and for providing results of the test.

22. The computer-readable medium claim 19, wherein said simulated client application program interface comprises software for testing said user application, and for providing results of the test.

23. The computer-readable medium claim 19, wherein said data repository comprises data representative of a real enterprise computing management system.

24. The computer-readable medium of claim 18, wherein said simulated management infrastructure stack and said user application are compliant with a WEBM protocol.

25. A computer-readable medium having computer-readable program code embodied therein for causing a computer to perform a method of testing a user application for managing an enterprise computing management systems, comprising:

forming a simulated management infrastructure stack based on at least a portion of a real management infrastructure stack;

replacing at least one client application program interface of said real management infrastructure stack with at least one simulated client application program interface that has no dependency on any other component in the real management infrastructure stack; and using said simulated management infrastructure stack to test said user application.

26. The computer-readable medium claim 25, wherein said simulated management infrastructure stack further comprises a data repository.

27. The computer-readable medium claim 26, wherein said simulated client application program interface comprises software for processing a request for data for a real enterprise computing management system, and for providing a reply to said request.

28. The computer-readable medium claim 26, wherein said simulated client application program interface comprise software for testing a real enterprise computing management system, and for providing results of the test.

* * * * *

UNITED STATES PATENT AND TRADEMARK OFFICE
CERTIFICATE OF CORRECTION

PATENT NO. : 7,272,548 B2
APPLICATION NO. : 10/456199
DATED : September 18, 2007
INVENTOR(S) : Bryan J. Jacquot et al.

It is certified that error appears in the above-identified patent and that said Letters Patent is hereby corrected as shown below:

In column 1, line 51, delete "deamon-plugin" and insert -- daemon plug-in --, therefor.

In column 1, line 54, delete "210" and insert -- 201 --, therefor.

In column 1, line 63, delete "210" and insert -- 201--, therefor.

In column 8, line 11, in Claim 4, after "system" delete ",".

In column 8, line 15, in Claim 5, after "application" delete ",".

In column 9, line 12, in Claim 19, after "medium" insert -- of --.

In column 9, line 15, in Claim 20, after "medium" insert -- of --.

In column 9, line 20, in Claim 21, after "medium" insert -- of --.

In column 9, line 23, in Claim 21, after "system" delete ",".

In column 9, line 24, in Claim 22, after "medium" insert -- of --.

In column 9, line 26, in Claim 22, after "application" delete ",".

In column 9, line 28, in Claim 23, after "medium" insert -- of --.

UNITED STATES PATENT AND TRADEMARK OFFICE
CERTIFICATE OF CORRECTION

| | |
|---|---|
| PATENT NO. | : 7,272,548 B2 |
| APPLICATION NO. | : 10/456199 |
| DATED | : September 18, 2007 |
| INVENTOR(S) | : Bryan J. Jacquot et al. |

It is certified that error appears in the above-identified patent and that said Letters Patent is hereby corrected as shown below:

In column 10, line 18, in Claim 26, after "medium" insert -- of --.

In column 10, line 21, in Claim 27, after "medium" insert -- of --.

In column 10, line 25, in Claim 27, after "system" delete ",".

In column 10, line 27, in Claim 28, after "medium" insert -- of --.

In column 10, line 31, in Claim 28, after "system" delete ",".

Signed and Sealed this

First Day of July, 2008

JON W. DUDAS
*Director of the United States Patent and Trademark Office*